H. G. PURINTON.
MILKING PAIL AND COVER THEREFOR.
APPLICATION FILED JULY 1, 1914.

1,126,564.

Patented Jan. 26, 1915.

Witnesses
J. H. Crawford
H. H. ......

Inventor
H. G. Purinton,
By Victor J. Evans
Attorney

UNITED STATES PATENT OFFICE.

HARLOW G. PURINTON, OF ADAMSVILLE, MASSACHUSETTS.

MILKING-PAIL AND COVER THEREFOR.

1,126,564.   Specification of Letters Patent.   Patented Jan. 26, 1915.

Application filed July 1, 1914. Serial No. 848,450.

*To all whom it may concern:*

Be it known that I, HARLOW G. PURINTON, a citizen of the United States, residing at Adamsville, in the county of Franklin and State of Massachusetts, have invented new and useful Improvements in Milking-Pails and Covers Therefor, of which the following is a specification.

An object of the invention is to provide a milking pail and cover therefor, and in which the cover, held upon the milking pail when the same is in use, will prevent dust, germs or other foreign matter from entering the pail along its upper edge, the cover being furthermore designed and adapted so that it can be retained in place upon the pail during the process of tilting the pail to pour the contents therefrom.

The invention contemplates, among other features, the provision of a cover which, when used in connection with a milking pail, will provide a means for straining the milk which enters the pail, the cover being held upon the pail during the milking operation and whereby, furthermore, the milk can be poured from the pail without removing the cover therefrom.

Figure 1:
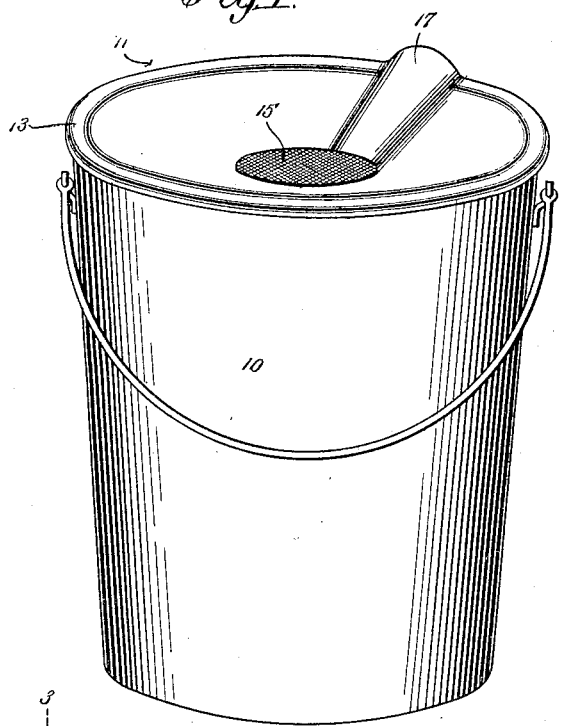
Figures 2, 3:
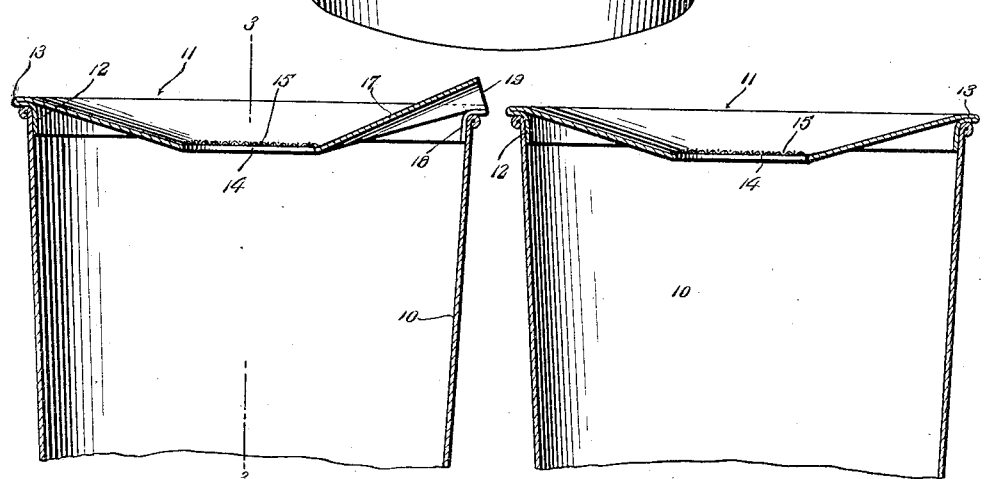

In the further disclosure of the invention reference is to be had to the accompanying drawings, constituting a part of this specification, in which similar characters of reference denote corresponding parts in all the views, and in which:

Figure 1 is a perspective view of the pail and cover; Fig. 2 is a sectional view taken through the pail and cover; and Fig. 3 is a vertical transverse sectional view taken on the line 3—3 in Fig. 2.

Referring more particularly to the views, I provide a pail body 10 which can be of any desired shape and which is adapted to receive a cover body 11 formed to provide an annular depending flange 12 adjacent its periphery and which flange is adapted to lie wholly within the pail body 10 when the cover is arranged in position thereon, thus providing a horizontal circular extension 13 and which overlaps the edge of the pail body, thus forming a joint which will prevent the entrance of dust, dirt or other foreign matter between the edge of the pail body and cover body.

The cover body is depressed at its center, as shown, and there is provided with an opening 14 which may be either square or round and in which is suitably secured in any convenient manner a strainer 15.

The cover body 11 between its peripheral edge and the opening 14 is provided with a bulged portion 17, the flange 12 being provided with a cut away portion 18 at this point, and whereby the bulged portion 17 and cut away portion 18 form a pouring spout 19, through which the contents of the pail body can be poured when the same is tilted.

From the foregoing description it will be seen that the cover normally fits tight upon the pail; that the cover is held in place while the device is used in the milking operation; that the milk will be strained when entering the pail and that the milk can be readily poured from the pail without removing the cover, while at the same time the cover can be removed from the pail for the purpose of cleaning the pail and cover.

Having thus described my invention, I claim:

1. In combination with a pail, a cover body depressed at its center and provided with an opening at its point of depression, means for securing the cover body upon the pail and forming a joint with the edge of the pail, and a pouring spout formed on the cover by bulging a portion thereof relatively to the pail between the said opening and the edge of the cover, said pouring spout extending from said depression outwardly to the edge of said cover.

2. A cover for pails comprising a body having a central opening, with the said body adapted for removable engagement with the pail, and a pouring spout formed with the body between the opening and the edge thereof, that portion of the body forming the pouring spout being spaced from the edge of the pail, and extending to the edge of the cover and beyond the edge of the pail.

In testimony whereof I affix my signature in presence of two witnesses.

HARLOW G. PURINTON.

Witnesses:
HARRY C. ROBINSON,
ALBERT B. ALLEN.

Copies of this patent may be obtained for five cents each, by addressing the "Commissioner of Patents, Washington, D. C."